Nov. 2, 1954  J. R. TIMMONS ET AL  2,693,151
WORK STATION FOR CONVEYERS
Filed April 21, 1950  4 Sheets-Sheet 1
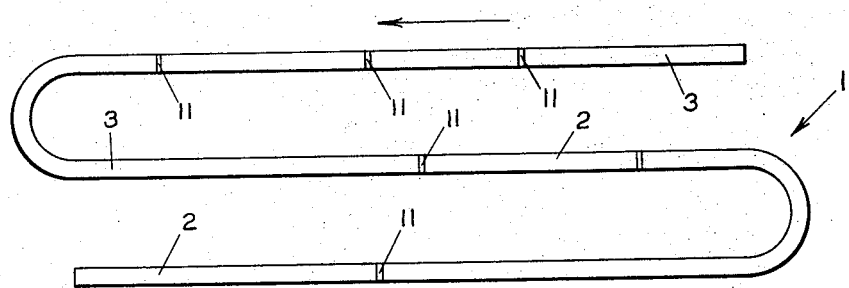
fig. 1
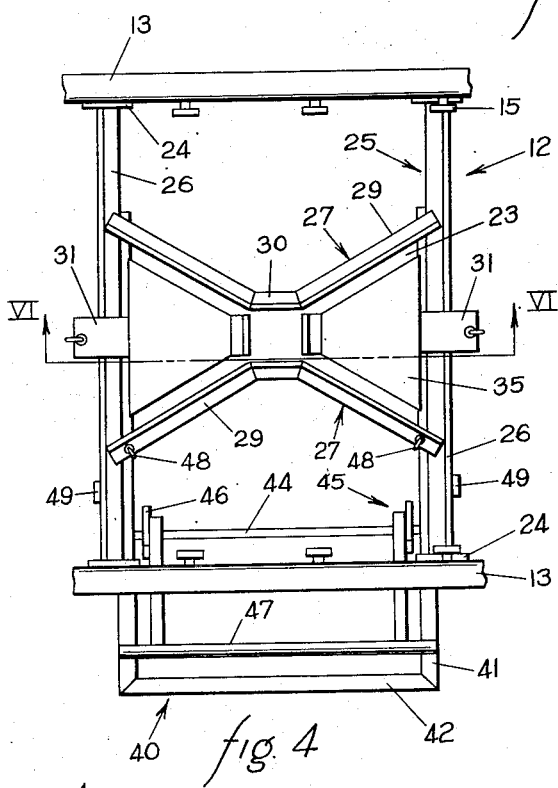
fig. 4
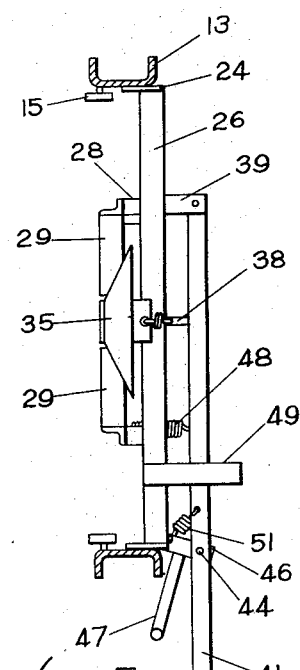
fig. 5
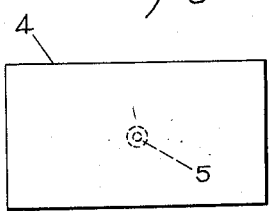
fig. 2
fig. 3
JAMES R. TIMMONS
HENRY VELTMAN   } Inventors
ALBERT P. WEILAND, JR.
EDWARD F. ZAMBROSKI
by Peter P. Price  Attorney

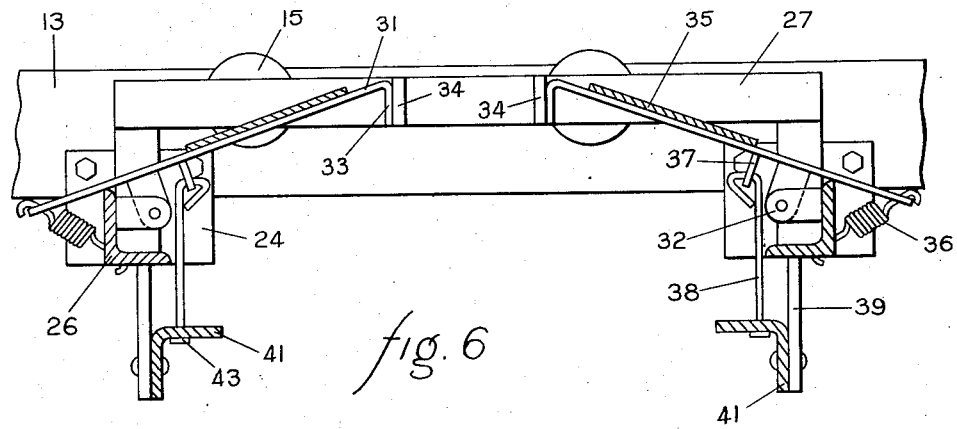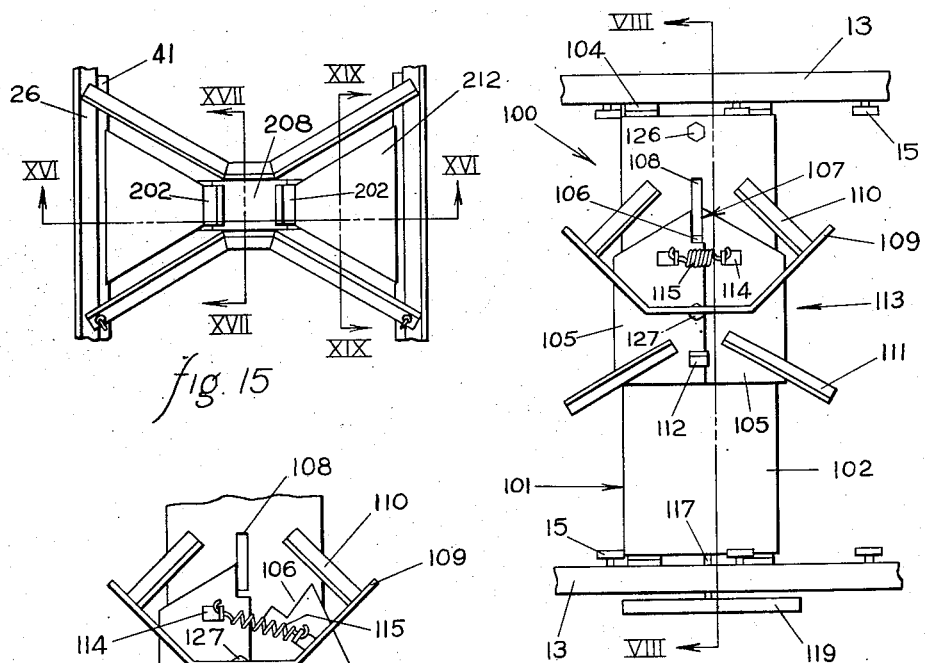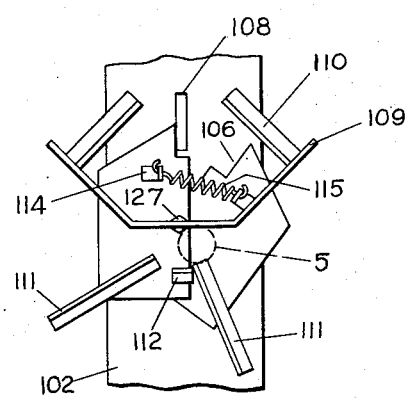

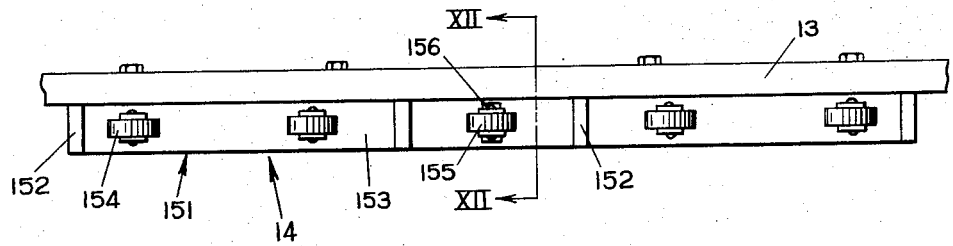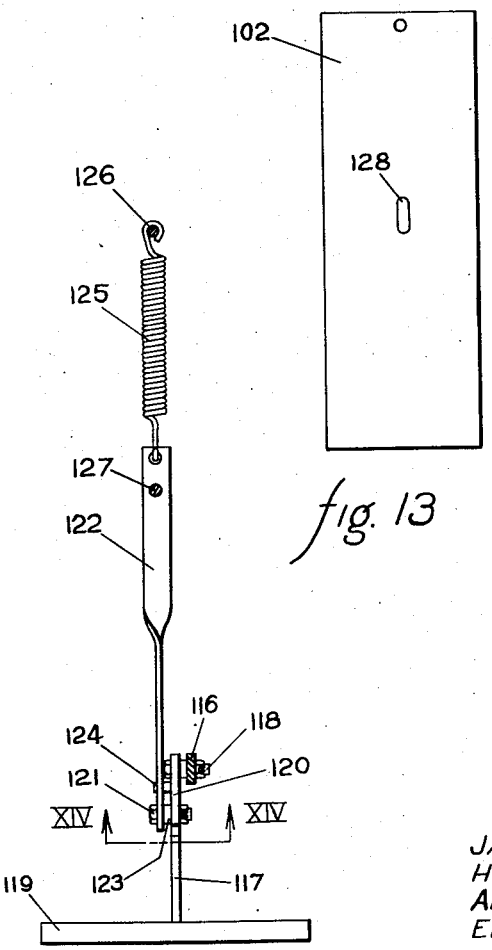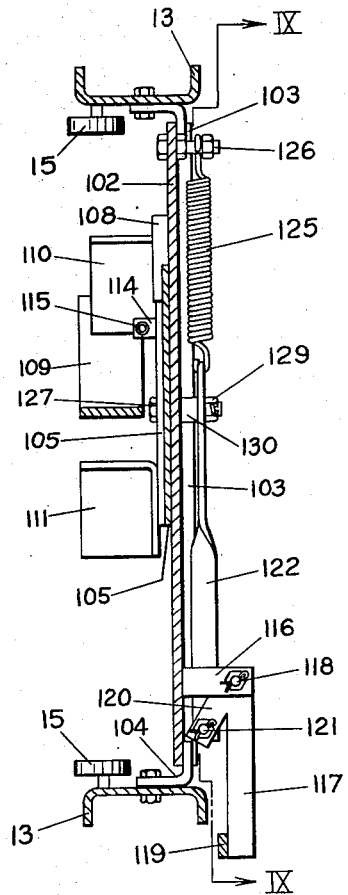

Nov. 2, 1954  J. R. TIMMONS ET AL  2,693,151
WORK STATION FOR CONVEYERS
Filed April 21, 1950  4 Sheets-Sheet 4
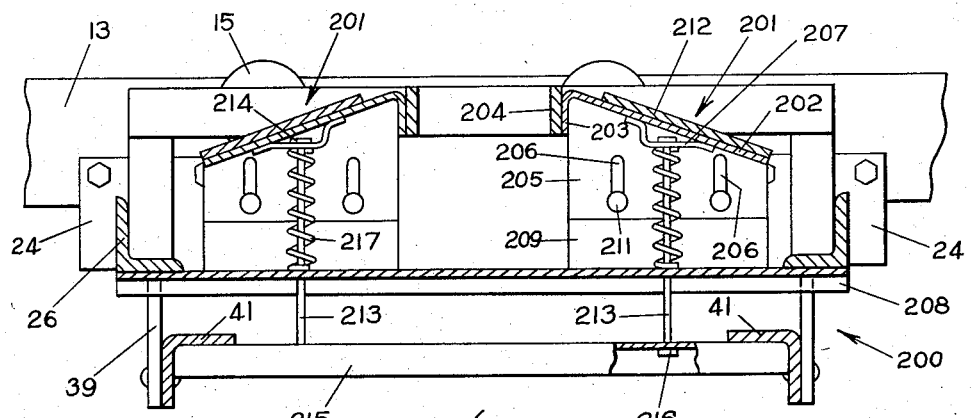
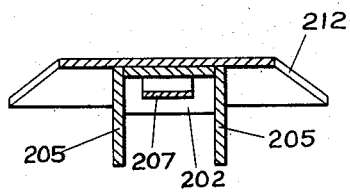
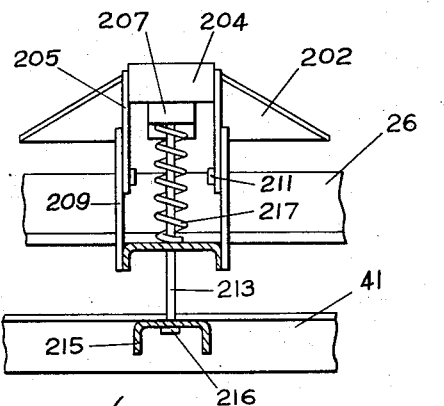
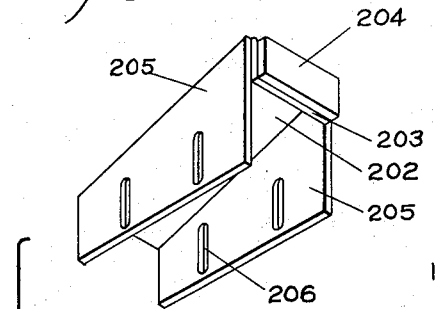
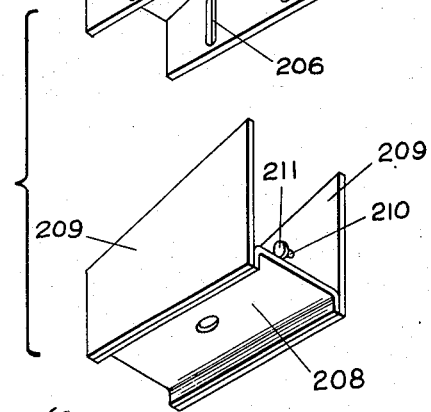
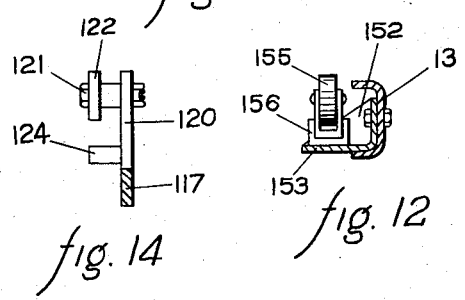
JAMES R. TIMMONS
HENRY VELTMAN
ALBERT P. WEILAND, JR.
EDWARD F. ZAMBROSKI
Inventors
by Peter P. Price
Attorney

# 2,693,151

WORK STATION FOR CONVEYERS

James R. Timmons, Henry Veltman, Albert Paul Weiland, Jr., and Edward F. Zambroski, Grand Rapids, Mich., assignors to The Rapids-Standard Company, Inc., Grand Rapids, Mich., a corporation of Michigan Application April 21, 1950, Serial No. 157,262

9 Claims. (Cl. 104—249)

This invention relates to conveyors and more particularly to a conveyor system for use in the fabrication division of a manufacturing plant and to the work stations to be incorporated in such a conveyor system.

Existing conveyor systems designed to transport articles through the various steps involved in a manufacturing process have been subject to several serious disadvantages. One of the principal disadvantages has been the rigid character of these systems whereby they cannot be adapted to changing manufacturing needs. Once installed, it is an expensive operation to modify them when the location of any of the work stations must be changed.

Another fault of these existing systems is their high initial and maintenance costs. It is standard practice to design each unit of these systems as a specialized unit adapted only to the demands of a particular plant, and frequently only to the requirements of a particular portion of a single installation. A conveyor system having complex, expensive and specialized work stations frequently necessitates modification of the manufacturing operation to suit the established conveyor system rather than modifying the conveyor to accommodate the operation.

Our invention eliminates these disadvantages by providing a work station adapted to simple and inexpensive relocation for meeting changing manufacturing operations. The work stations for our conveyor system may be added, eliminated or relocated with a minimum of interference with the system as a whole.

It has long been standard practice in the design of conveyor systems to incorporate therein specially designed sections to serve as work stations. These work stations are provided in order that the work, travelling along the conveyor, may be halted for a period of time and in many cases rotated in order that a workman standing on one side of the conveyor may have access to all sides of the work.

It has also been standard practice to rotate the work at the work station either by so constructing the work station that the entire station may rotate about a central pivot or to design the station in such a manner that only the pallet and work are rotated. In either case, it is important that the pallet and work be centrally located on the work station. Heretofore no means has been provided for automatically locating and holding the pallet while it is being rotated. This failure to secure the pallet results in numerous malfunctions of the work station, particularly in the situation in which the work station is stationary and the pallet rotates upon it.

In designing a means for automatically arresting and locating the pallet, it is desirable that the mechanism be simple, positive and capable of properly aligning pallets which for any reason have become misaligned in travel. It is also desirable that the arresting mechanism be capable of being set in inoperative position in order that pallets may pass through the work station without interference when it is desirable to deactivate the work station for one reason or another.

In a structure whereon the pallet is rotated upon swivel casters designed to align themselves tangentially to the rotational movement of the pallet, it is essential that the pallet be held in a position concentric with the group of supporting swivel casters. Unless the pallet is originally located concentrically with the supporting swivel casters and maintained in such position, the pallet may become difficult, if not impossible, to rotate. Particularly is this true if the pallet is supporting a heavy load.

It is, therefore, a primary object of our invention to provide an industrial conveyor system adapted to simple modification to meet changing use requirements.

It is an additional object of our invention to provide a conveyor having one or more work stations each equipped with a pallet locating and arresting mechanism.

It is a further additional object of our invention to provide a pallet arresting mechanism capable of automatically arresting and locating a pallet concentrically upon the work station.

Another object of our invention is to provide such a pallet arresting mechanism which may be quickly moved from one portion of the conveyor system to another without necessitating modification of the conveyor track.

Other objects and purposes of our invention will be immediately apparent to those acquainted with the art of conveyor system design and installation upon reading the following specification and the accompanying drawings.

In the drawings:

Figure 1 is a plan view of a conveyor system embodying our invention.

Figure 2 is a plan view of a pallet adapted for use on our conveyor system.

Figure 3 is a side elevation view of the pallet shown in Figure 2.

Figure 4 is a plan view of a pallet capture element for our conveyor system.

Figure 5 is an end elevation view of the pallet capture element shown in Figure 4.

Figure 6 is an enlarged sectional elevation view of our pallet capture element taken along the plane VI—VI of Figure 4.

Figure 7 is a plan veiw of a modification of our pallet capture element.

Figure 8 is an enlarged sectional elevation view of our modified pallet capture element taken along the plane VIII—VIII of Figure 7.

Figure 9 is a sectional view of our modified pallet capture element taken along the plane IX—IX of Figure 8.

Figure 10 is a fragmentary plan view of our modified pallet capture element showing the element in one operating position.

Figure 11 is a plan view of an auxiliary caster bed for the work stations of our conveyor system.

Figure 12 is a sectional elevation view of the auxiliary caster bed taken along the plane XII—XII of Figure 11.

Figure 13 is a plan view of the base plate for our modified pallet capture mechanism.

Figure 14 is a sectional elevation view taken along the plane XIV—XIV of Figure 9.

Figure 15 is a fragmentary plan view of a modified design for our pallet capture element shown in Figure 4.

Figure 16 is a sectional elevation view taken along XVI—XVI of Figure 15.

Figure 17 is a sectional elevation view taken along the plane XVII—XVII of Figure 15 but not showing the guides.

Figure 18 is an exploded, isometric view of the vertically adjustable pallet holding member and the carriage on which it slides.

Figure 19 is a sectional elevation view taken along the plane XIX—XIX of Figure 15 but not showing the guides.

In executing the objects and purposes of our invention we have provided a conveyor system having at certain intervals sections constituting work stations. Each of these work stations is provided with a passageway for aligning and guiding the pallets to a capture mechanism adapted to automatically arrest a pallet's movement and hold it against displacement either longitudinally or laterally of the conveyor. Each of these capture mechanisms is designed as a completely self-contained unit adapted to being detachably mounted in a section of gravity conveyor of conventional design without requiring reworking of the conveyor.

In the following description the terms "upwardly" and "downwardly" are frequently used and are to be taken as "upwardly" in the direction of the top of the conveyor as normally installed and "downwardly" away therefrom.

The terms "inwardly" and "outwardly" are also frequently used and are to be taken as "inwardly" toward the geometric center of the work station and "outwardly" away therefrom.

The numeral 1 refers to a conveyor system of any suitable length, shape and arrangement. The conveyor system 1 consists of a plurality of tandemly arranged conveyor sections 2. The conveyor system 1 is designed to move articles mounted on pallets 4 along the conveyor system. The pallets 4 are each equipped with a central, downwardly extending stud 5. Although it is not essential to the operation of our invention, it is preferable that the stud 5 consist of a downwardly extending peg 6 equipped with a radially extending roller or caster 7 at its lower end. The conveyor sections 2 may be equipped with a central guideway for engaging the central stud 5 where such is necessary, as on corners.

The conveyor sections 2 may be constructed in any suitable manner, as by joining together a number of standard lengths of conveyor track. A suitable design for one of these sections includes a pair of spaced rails 13 having a plurality of casters 15 mounted thereon for supporting the pallets 4. When it is desired to create a work station 11 in our conveyor system 1, this may be done simply by attaching a pallet arresting device, that is a capture element or mechanism 12, 100 or 200, to the rails 13 of one of the sections of conveyor. When it is desired to facilitate rotation of the pallet 4 at one of the work stations 11, a bed 14 (Figs. 11 and 12) of swivel casters may be mounted on each of the rails 13 centered about the capture mechanism 12 and the fixed casters on the rails removed. The use of the caster beds 14 normally is unnecessary but it is an additional facility at the work stations, desirable under certain conditions. The capture elements or mechanisms 12 are each designed to be an integrated unit which may be detached from the rails by a simple operation and moved to some new location, thus making it possible to relocate the work stations 11 along the length of the conveyor system 1 with a minimum of difficulty and cost.

The capture element or mechanism 12 is mounted on a frame 25 consisting of a pair of spaced cross members 26 joined together by means of the somewhat U-shaped guides 27. The guides 27 are spaced upwardly from the cross members 26 by means of the supports 28. The substantially U-shaped guides 27 are so arranged that their arms or wings 29 diverge away from each other and their nexuses or connecting webs 30 are adjacent each other but spaced apart a substantial distance to provide a passage therebetween. As so arranged, the guides 27 provide a substantially hourglass passageway 23 for the studs 5 of the pallets 4. At each end of each of the cross members 26 is a mounting plate 24. The mounting plates 24 on each cross member are spaced apart a distance equal to the spacing between the rails 13.

Between the guides 27 and mounted on each of the cross members 26 is an arm 31. Each of the arms 31 is secured to its associated cross member 26 by means of a hinge 32. Each of the arms 31 extends inwardly and upwardly from its associated cross member 26 and has a downwardly extending lip 33 on its extreme inward end for mounting a snubber 34. The inward ends of the arms 31 are spaced apart a sufficient distance that the roller or caster 7 of the pallet stud 5 may be received between them. The space enclosed between the connecting webs 30 of the guides 27 and the free ends of the arms 31 constitutes the capture chamber and the various parts surrounding this capture chamber are its enclosing walls. Each of the arms 31 is provided, on its upper surface, with a bearing plate 35 shaped in the form of an isosceles trapezoid to seat within the ends of the passageway 23. The outward ends of the arms 31 project a short distance beyond the hinges 32 and are urged downwardly by means of a spring 36 anchored on one of its ends to the outward end of the arm 31 and on the other of its ends to the cross member 26. As so mounted, the inward ends of the arms 31 are inclined upwardly to a point parallel to the upper edges of the guides 27. Adjacent and inwardly of the hinges 32, each of the arms 31 is provided with a downwardly extending leg 37 engaging the tension members or links 38. The links are designed to operate only under tension loads. Therefore, they may be made of flexible material if desired.

Mounted to each of the cross members 26 is a downwardly extending post 39 positioned on one side of the passageway 23. Mounted to each of the posts 39 is a lever assembly 40 including a pair of beam members 41 joined at their ends remote from the posts 39 by a lever peddle 42. By means of appropriate openings, the links 38 extend through the beam members 41 and are each equipped with a stop collar 43 for contacting the lower surface of the beam members 41. The stop collars 43 provide the only positive connection between the links 38 and the beam member 41 whereby the links 38 are free to move downwardly without interference from the beam members 41, but upon downward movement of the lever assembly 40, the links 38 will be similarly moved to pivot downwardly the arms 31 about their hinges 32.

Adjacent the point where the lever assembly 40 passes under the rail 13 of the conveyor section, a rod 44 is mounted between the beam members 41 for mounting the lock assembly 45. The lock assembly 45 includes a pair of check plates 46 mounted on the rod 44 adjacent each of the beam members 41. The check plates 46 support the yoke-shaped lock pedal 47, which lock pedal 47 extends outwardly above the lever assembly 42 a substantial portion of the distance between the rail 13 and the lever pedal 42. The check plates 46 are held in normally, inwardly rotated position by the spring 51, anchored on one of its ends to one of the check plates 46 and on the other of its ends to one of the cross members 26.

The lever assembly 40 is held in normally upward position, i. e., parallel to the frame 25, by means of a pair of springs 48 each anchored on one end to a leg of one of the guides 27 and on its other end to one of the beam members 41. The downward pivotal movement of the lever assembly 40 is limited by a pair of stops 49 secured on their upper ends to the cross members 26 and having an inwardly extending lip on their lower ends for engaging the lower surface of the lever assembly 40.

In the above description we have set forth a preferred embodiment of our capture element or mechanism. In the following paragraphs we shall describe another design for our capture mechanism. The design for the capture element or mechanism which we are about to describe, although operating quite satisfactorily under certain conditions, is less preferable than the capture mechanism design which we have described above when the operating conditions at the work stations involve large quantities of loose waste materials, such as chips or fogging from spray guns.

The capture mechanism 100 includes a base frame 101 consisting of a plate 102 having re-enforcing flanges 103 and mounting brackets 104 on each end for engaging the rails 13 of the conveyor. Mounted on top of the base frame 101 are a pair of pivot plates 105. The pivot plates 105 are arranged in side by side and partially overlapping position longitudinally of the conveyor system 1. The overlap of the pivot plates 105 is at the center of the capture mechanism 100. Within the overlapping portion of the pivot plates 105 and adjacent their geometrical center, a hole is provided through both pivot plates. The pivot plates 105 are each equipped with a cutout 106 at one of their ends, which cutouts 106 cooperate, when the pivot plates 105 are mounted in overlapping position, to form a slot 107 for receiving the stop member 108. The stop member 108 is rigidly secured to the base plate 102 by any convenient means such as welding. A somewhat U-shaped guide member 109, having its apex or nexus directed toward and adjacent the center of the capture mechanism, is mounted to the base plate 102 by means of the support members 110. By means of the support members 110, the guide 109 is spaced a sufficient distance above the pivot plates 105 that no physical contact occurs between the pivot plates 105 and the guide 109. The sides of the substantially U-shaped guide 109 diverge outwardly away from the center of the capture mechanism.

Each of the pivot plates 105 mounts an outwardly diverging guide or wing 111 forming an incomplete V having its vertex substantially at the center of the capture mechanism 100. Outwardly of the center of the capture mechanism 100 and substantially midway between the wings 111 is a closure member or guard 112 mounted to the upper of the pivot plates 105. The guide 109, wings 111 and guard 112 together form a substantially hourglass-shaped passageway 113 extending through the capture mechanism 100 longitudinally of the conveyor system 1. The inward ends of the wings 111, guard 112 and the nexus of the guide 109 together constitute walls enclosing a capture chamber between them. Outwardly of the guide 109, each of the pivot plates 105 is equipped with an upwardly extending tab 114. A spring 115 extends between and is mounted to each of the tabs 114.

Adjacent an end of the base plate 102 remote from the guide 109, a downwardly projecting leg 116 is mounted to the lower surface of the base plate 102 for pivotally supporting, by means of the bolt 118, the beam member 117. The beam member 117 projects outwardly beyond the conveyor rail 13 and mounts a treadle plate 119 at its outward end. An arm 120 is mounted at a substantial angle, such as 35°, to the beam member 117 adjacent the bolt 118 and extends outwardly and upwardly from the inward end of the beam member. By means of a bolt 121, a link 122 is secured to the upper outward end of the arm 120. A spacer 123 (Fig. 9) between the arm 120 and the link 122 sufficiently separates the link 122 and arm 120 to prevent conflict between the link 122 and the bolt 118 as the beam member 117 and arm 120 are rotated about the bolt 118. The bolts 118 and 122 are both secured in position by means of a castle nut and cotter pin arrangement. The limit boss 124 (Fig. 14) is mounted on the beam member 117 adjacent the arm 120 to limit the downward rotation of the beam member 117 by contacting the lower surface of the link 122.

The link 122 consists of a rectangular section twisted 180° about its longitudinal center line at a point substantially midway between its ends whereby its broad face is vertical where it is mounted to the arm 120 and horizontal adjacent the center of the capture mechanism 100. At its inward end the link 122 is provided with a pair of holes arranged in tandem, the one nearest the end of the link being adapted to receive the end of a spring 125. The spring 125 is secured at the other of its ends to the base plate 102 by means of a bolt 126. The spring 125 urges the link 122 inwardly and at the same time urges the arm 120 and the beam member 117 upwardly. The other of the holes adjacent the inward end of the link 122 receives a pivot pin or bolt 127 extending downwardly through the central opening in the pivot plates 105 and an elongated slot 128 (Fig. 13) in the base plate 102 and secured by a castle nut and cotter pin assembly 129. The link 122 is separated from the base plate 102 by means of a spacer 130 surrounding the bolt 127.

The pallet arresting or capture mechanism 12 may be modified by designing the movable pallet stud engaging members to move vertically, as a whole, rather than to pivot about a hinge. This modified capture mechanism 200 is shown in Figures 16, 17, 18 and 19 and, except for the design and operation of the movable stud holding members, it is the same in both construction and operation as the capture mechanism 12.

The catch elements or movable members 201 each include an inclined top member 202 having a depending lip 203 at its upper end. A nonmetallic snubber 204 is mounted on each of these lips. A vertical side plate 205 is welded to the top member 202 at each side thereof. The vertical side plates 205 by proper design, may be made integral with the top member 202. The side plates 205 are parallel to each other and are each equipped with a pair of vertical, elongated slots 206. A bracket 207 is mounted to the under surface of the top member 202 adjacent its center. The bracket 207 is so shaped that when the top member 202 is seated in its normal inclined position, the bracket 207 forms a horizontal platform.

Aligned vertically below the movable members 201 and rigidly anchored to each of the cross members 26 is the channel section 208. The channel section 208 extends between the beam members 41 longitudinally of the conveyor along the conveyor centerline. The channel section 208 is the same width as the spacing between the outer surfaces of the side plates 205 whereby the guide plates 209, attached to each side of the channel section 208, may receive the movable members 201 between them. The clearance between the side plates 205 and the guide plates 209 is such that the movable members 201 may slide freely in relation to the guide plates 209 but with a minimum of play between these parts. A pair of the guide plates 209 are mounted adjacent each end of the channel section 208, each pair embracing one of the movable members 201. Each of the guide plates is equipped with a pair of inwardly extending pins 210, each equipped with a head 211. Each of the pins 210 seats within one of the slots 206 with the head 211 engaging the inner surface of the side plate. Each pair of the guide plates 209 constitutes a support member for one of the movable members 201.

The movable members 201 are, at all times, held in proper alignment by the pins 210, and the upper and lower limit of their travel is determined by contact between the guide pins and each end of the slots 206. Sufficient vertical spacing is provided between the lower end of each of the side plates 205 and the upper surface of the channel section 208 to permit the movable members 201 to travel the full vertical distance permitted by the length of the slots 206. Similar spacing is provided between the upper end of the guide plates 209 and the bearing plate 212.

Approximately at the center of each of the movable members 201 is a tension member or rod 213. The rod 213 may be replaced with a flexible element such as a chain or rope since it is designed to operate only under a tension load. The upper end of the rod 213 extends through the center of the horizontal portion of the bracket 207 by means of a suitable clearance hole. A head 214, secured to the upper end of the rod 213, bears against the upper surface of the bracket 207. Each of the rods 213, by means of a suitable clearance hole, passes through the channel section 208.

Vertically aligned with and parallel to the channel section 208 is the cross channel 215 anchored to and extending between the beam members 41. The lower end of each of the rods 213 extends through the cross channel 215 and is equipped with a button-like head 216 for engaging the under surface of the cross channel.

Between the bracket 207 and the channel section 208 the rod 213 is surrounded by a coil spring 217 bearing against the bracket 207 at its upper end and against the channel section 208 at its lower end. Each of the coil springs 217 independently urges one of the movable members 201 upwardly.

The structure associated with and the operation of the beam members 41 is not described at this point because it is identical to the corresponding parts described for capture mechanism 12.

The capture mechanisms 12, 100 and 200 are each preferably so designed and mounted on the conveyor that the capture chamber is centered about the longitudinal centerline of the conveyor. This is essential when it is desired to rotate the pallets while they are held by the capture mechanism. When a single, centrally located capture mechanism is employed, the stud 5 is centrally located on the pallet 4.

When it is desired to facilitate rotation of the pallets at any of the work stations 11, caster beds 14 (Figs. 11 and 12) may be substituted for the casters 15 on the rails 13 of the conveyor section. The caster beds 14 include an elongated shelf bracket 151 re-enforced by the triangular brace members 152. One of the shelf brackets 151 is used on each of the rails 13 and it is demountably secured to these rails 13 by means of screws, bolts or other suitable fastening means. The shelf brackets 151 are centered about the capture mechanism. On the horizontal leg 153 of the shelf brackets 151 there are mounted a plurality of horizontally rotatable swivel casters 154. The caster 155 mounted on the shelf bracket 151 on the lateral center line of the capture mechanism is aligned with the longitudinal axis of the conveyor and is secured against horizontal rotation by means of a clip 156. The caster beds 14 may be used in conjunction with any one of work stations 12, 100 or 200.

Each of the various parts making up our conveyor system and capture mechanisms may be fabricated from any suitable material, such as steel, magnesium, aluminum or composition materials where such have suitable operating characteristics. All joints between parts, except where specifically provided otherwise, may be made by welding, bolting or by any other suitable fastening means.

*Operation*

Our conveyor system is designed to be installed in an industrial plant and to be capable of easy and quick adaptation to varying operating conditions. This ease of modification is designed to facilitate use of this conveyor system not only as between plants but to give the conveyor flexibility to meet varying operating conditions within a plant at any time after its initial installation.

The normal conveyor system installed in an industrial manufacturing plant includes one or more work stations at which the articles being transported on the pallets are processed in the manufacturing operation. To provide the maximum of facility for our conveyor system, it has been so designed that the work stations may be created at any desired point along the conveyor system 1 with little or no modification of the particular conveyor sections chosen to function as work stations. By means of our invention, a suitable work station may be created simply by mounting the capture mechanism between and to the rails of a conveyor section by means of screws or bolts. With our invention, an existing work station at any point on the conveyor system may be abandoned and a new work station created by the simple expedient of removing the capture mechanism at that point on the conveyor system constituting the existing work station and relocating it at the new point in the conveyor system selected to become a work station. Unless the special supports 150 are utilized, no reworking of the conveyor section selected as a work station is required.

Our capture mechanisms are designed for a gravity conveyor system, at least in the area of the work stations. This is made necessary because the pallets are delayed at each of the work stations while the articles on the pallets are processed. During this delay the pallets are firmly held against movement along the conveyor. Standard powered conveyors do not permit this flexibility in movement of the pallets.

The capture mechanisms 12, 100 and 200 each operate, in principle, in the same manner. As one of the pallets 4 approaches a work station 11, the stud 5 enters the passageway created between the guides of the capture mechanism. Since the passageway through the capture mechanism is formed in a substantially hourglass shape, any lateral displacement of the stud 5 is corrected by the diverging wings of the guides defining the passageway. As the stud 5 continues to move into the capture mechanism, one of the members of the capture mechanism is moved out of the way of the stud by the force of its forward movement (Fig. 10), permitting the stud to enter the capture chamber at the center of the capture mechanism. Once having entered the capture chamber, the member displaced by the moving stud 5 moves back into its normal position, imprisoning the stud 5 within the capture chamber. Thus, movement of the pallet 4 along the conveyor is halted. Since the stud 5 is prevented from escaping from the capture chamber until released by the operator, the pallet 4 is held against motion along the conveyor system 1 in either direction.

While the pallet is thus arrested, the operator may perform whatever work is to be done to the article mounted on the pallet 4. When the special supports 14 are not utilized, the pallet 4, while held by a capture mechanism, will resist a certain amount of pressure which would otherwise rotate it. However, if sufficient pressure is applied to one corner of the pallet 4, it may be rotated about its stud 5. The ease with which this may be done is sufficient for many operations. However, when the pallets 4 are to be frequently rotated at one of the work stations, the casters 15 may be replaced by the special supports 14 to facilitate this rotation. When the operator has completed his work he may reinitiate the pallet's travel along the conveyor by releasing the stud 5 from the capture mechanism. Since the work stations are mounted directly in any section of the gravity conveyor portions 2 of the conveyor, the work station may easily be designed to be on a slight inclination, urging the pallets to move out of the work station when released from the capture mechanism. As many of such work stations may be incorporated in our conveyor system 1 as are desired.

Referring now to the specific operation of one of the particular capture mechanisms, the capture mechanism 12 is seated between the rails 13 of a section of gravity conveyor and attached to the rails 13 by means of bolts and the mounting plates 24. As so seated, the upper edge of the guides 27 is substantially parallel to or slightly below the upper edge of the rails 13, and the lever assembly 40 extends outwardly beyond one side of the conveyor beneath the rails 13. The passageway between the guides 27 is positioned midway between and parallel to the rails 13. The inward ends of both of the arms 31 are held in their normally upward position. As a pallet 4 approaches the capture mechanism 12, its stud 5 enters the passageway and upon contact with one of the arms 31 depresses that arm by forcing its inward end downwardly about its hinge 32. When the stud 5 reaches the capture chamber or the area at the center of the capture mechanism between the inward ends of the arms 31, the stud 5 releases the depressed arm 31 which moves upwardly into its normal position under the urging of the spring 36. The other of the arms 31 arrests the forward motion of the stud 5 and pallet 4, and the released arm 31 prevents the stud 5 from leaving the capture mechanism by backtracking along the conveyor.

When it is desired to release the pallet 4 from the work station, the lever assembly 40 is depressed, pulling the inward ends of both of the arms 31 downwardly to a point at which the lower end of the stud 5 may move over them without interference. When the stud 5 has moved out of the capture mechanism, the lever assembly 40 is released and moves into its normal, upward position under the urging of the springs 48. The arms 31 are moved into their normal position by the springs 36.

When it is desired to temporarily suspend the operation of a work station, the capture mechanism may be rendered inoperative by depressing the lever assembly 40 and locking it in the depressed position. The lever assembly 40 is locked in depressed position by depressing the lock pedal 47, thus pivoting the check plates 46 into a position in which they engage the lower surface of one of the rails 13. The frictional engagement between the rail 13 and the check plates 46 created by the upward pressure of the lever assembly 40 prevents the check plates 46 from disengaging the rail 13. To reactivate the work station, the lever assembly 40 is temporarily depressed, freeing the check plates 46 by pivoting them away from the rail 13 under the urging of the spring 51. Upon release of the lever assembly 40, the lever assembly 40 and the arms 31 will return to their normal operative positions.

Since the arms 31 are free to act, each independently of the other, the capture mechanism 12 may be used to arrest pallets moving in either direction. By reason of this feature it is also possible to mount the capture mechanism with the lever mechanism 40 projecting from either side of the conveyor.

Turning now to the capture mechanism 100, the mounting brackets 104 are secured to the plate 102 by bolts or welding. The vertical flanges of the mounting brackets 104 are spaced apart a distance equal to the spacing of the rails 13 whereby they may be seated between and bolted to the rails 13. Thus, the capture mechanism 100 is adapted to be simply and easily mounted, as a unit, between the rails of a conventional conveyor.

The capture mechanism 100, like the capture mechanism 12, operates in response to the movement of a pallet 4 and its associated stud 5. As the stud 5 enters that part of the passageway which is too narrow for the stud 5, it strikes the wing 111 of the pivot plate 105 adjacent the stud 5. Under the urging of the stud this pivot plate 105 rotates about the bolt 127 (Fig. 10) in such a manner as to move the inward end of the wing 111 inwardly and away from the guide member 109, thereby widening the passageway sufficiently to permit the stud 5 to enter the capture chamber at the center of the capture mechanism 100. Upon entering the capture chamber, the stud 5 disengages the wing 111 permitting the wing 111 and the pivot plate 105 to return to their normal position under the urging of the spring 115. Throughout this operation the other of the pivot plates 105 remains stationary and prevents the stud 5 from passing through the capture chamber.

To release the pallet from a work station equipped with a capture mechanism 100, the treadle plate 119 is pressed downwardly, rotating the arm 120 and drawing the link 122 toward the treadle plate 119. By means of the bolt 127, both of the pivot plates 105 are moved with the link, thus widening the passageway sufficiently to permit the stud 5 to escape the capture mechanism 100. As soon as the stud 105 has left the capture mechanism 100, the treadle plate 119 is released, permitting the treadle plate 119, link 122, and pivot plates 105 to return to their normal positions under the urging of the spring 125.

As the pivot plates 105 are simultaneously moved under the urging of the link 122 they withdraw from the stop member 108 but do not disengage it. The engagement between the pivot plates 105 and the stop member 108 limits the pivotal movement of the pivot plates 105 in response to the spring 115. The stop member 108 also limits the movement of the pivot plates 105 in response to the spring 125.

When it is desired to temporarily inactivate the capture mechanism 100, the treadle plate 119 is depressed downwardly until further movement is stopped by contact between the link 122 and the limit boss 124. In this position the centerline of the link 122 is moved to a position below the centerline of the bolt, thus reversing the moment about the bolt 118. In this position, the spring 125 urges the link 122 downwardly against the limit boss 124 rather than upwardly. The mechanism will remain in this position until the treadle plate 119 is forcibly raised. With the mechanism held in this position, both of the pivot plates 105 will be withdrawn sufficiently to create a passageway through which the stud 5 of a pallet 4 may pass without interference.

The capture mechanism 100, like the capture mechanism 12, may be used for pallets moving in either direction since each of the pivot plates 105 is free to pivot independently of the other. Thus, the capture mechanism may be mounted with the treadle plate 119 on either side of the conveyor.

The operation of the capture mechanism 200 is similar to the operation of the capture mechanism 12 except that instead of the bearing plate pivoting downwardly about a hinge to admit the pallet stud 5 to or release it from the capture chamber, the bearing plate as a unit moves downwardly. As the moving pallet urges its depending stud 5 closer to the capture chamber, the movable member 201 resisting movement of the stud 5 is forced downwardly by the motion of the stud against the inclined surface of the bearing plate 212. When the stud has moved into the capture chamber, the spring 217 will urge the movable member 201 upwardly to entrap the stud. The strength of the spring 217 is designed to be such that it is sufficient to maintain the movable member 201 in its normally upward position but to offer only minor resistance to being compressed by the moving stud 5. The rod 213 is moved downwardly with the movable member. Since the only positive engagement between the rod 213 and the cross channel 215 is the head 216 which is free to move downwardly away from the cross channel 215, the downward movement of the rod 213 will not force the cross channel 215 downwardly. Thus, each of the movable members 201 is free to move in response to pallet studs 5 without interference from the cross channel 215. Since the movable members 201 are independent of each other, a work station equipped with one of the capture elements 200 is capable of receiving and arresting pallets approaching the work station from either direction.

When it is desired to lower the movable members 201 to release the stud 5 from the capture chamber, the cross channel 215, by means of the beam members 41, is moved downwardly pulling rods 213 and the movable members 201 downwardly. By locking the cross channel 215 in its downward position, the capture mechanism may be set in stationary, inoperative position.

The special supports or caster beds 14 may be used in conjunction with either the capture mechanism 12 or the capture mechanism 100. The casters 15 are removed from the rails 13 on the sides of the capture mechanism. The length of the area in which the casters are removed is at least equal to the length of the pallet 4 being used. A caster bed 14 is then installed on the outward face of each of the rails 13, preferably in such a manner that the upper surface of the swivel casters 154 corresponds with the upper surface level of the removed casters 15. The caster beds 14 are detachably mounted to the rails 13 so that they may be moved in the same manner as the capture mechanisms 12 and 100. Preferably they are so designed that their mounting bolts may use the holes left vacant by the removal of the casters 15.

Although the capture mechanisms 12, 100 and 200 are each described throughout as a unit detachably mounted to the conveyor, this detachable mounting is not essential. Each of these capture mechanisms, if desired, may be permanently anchored to the conveyor track as by welding.

Numerous modifications of our invention may be made without departing from the principle of the invention. Each of these modifications is to be considered as included in the hereinafter appended claims, unless these claims by their language expressly provide otherwise.

We claim:

1. A capture element for a conveyor, the combination comprising: a frame detachably mounted to said conveyor; a pair of longitudinally aligned arms each pivotally mounted adjacent one of its ends to said frame; said points of pivotal mounting of said arms substantially spaced apart; said arms each having a free end remote from said point of pivotal mounting, said free ends inclined upwardly and toward each other from said points of pivotal mounting; means individually urging said free ends of said arms upwardly whereby the free ends of each of said arms may be individually moved downwardly about said arm's point of pivotal mounting.

2. A capture element as described in claim 1 wherein a lever assembly is pivotally mounted to said frame; a link connecting said lever assembly and each of said arms for transmitting the pivotal motion of said lever assembly to said arms in one direction only.

3. A capture element for a conveyor, the combination comprising: a frame; a pair of longitudinally aligned members each pivotally mounted on one of its ends to said frame and each having an upwardly directed free end; said free ends of said members spaced apart a substantial distance for defining a capture chamber therebetween; means individually urging said free ends of said members upwardly whereby each of said free ends may be individually caused to pivot downwardly in response to downwardly applied pressure on the free end of said one member; lever members and means mounting said lever members to said frame for vertical, pivotal movement; means connected to said lever members and to said arms for transmitting vertical movement of said lever members to said arms; latches for holding said lever members and said arms in downward position.

4. In a conveyor having a pair of spaced rails, a pallet capture element and a plurality of pallets movable along said conveyor, each of said pallets having a downwardly directed stud element, said capture element comprising: a frame detachably mounted to said rails laterally of said conveyor; a pair of arms aligned longitudinally of said conveyor, each pivotally mounted adjacent one of its ends and having an upwardly inclined free end remote from said pivotal mounting; said free ends directed toward each other and spaced apart sufficiently to receive said stud therebetween; means for individually urging the free end of each of said arms upwardly whereby the free end of one of said arms may pivot downwardly under the urging of the stud of one of said pallets approaching said capture mechanism from the direction from which the free end of said arm is upwardly inclined; stop members mounted on said frame and engageable by said arms for limiting the upward travel of said free ends of said arms.

5. A capture element as described in claim 4 wherein a lever is pivotally mounted adjacent one of its ends below and to one end of said frame; a link connected on one of its ends to each of said arms between its point of pivotal mounting and its free ends; said links on the other of their ends extending through said lever; stop means on each of said links below said lever whereby said arms and links may move downwardly independently of said lever and are movable downwardly with said lever as said lever is pivoted downwardly about said one end thereof.

6. A capture element for a conveyor, said conveyor having at least one pallet travelling therealong, said pallet having a downwardly extending stud, said capture element comprising: a frame mounted on and traversely of said conveyor; a pair of partially overlapping plates; a pivot pin through the overlapping portions of both of said plates for mounting said plates to said frame; a somewhat U-shaped guide member mounted to said frame, and bridging over said plates in non-contacting relationship thereto and having its nexus adjacent said pin; a wing member mounted on each of said plates away from said pin in a direction opposite from said guide member, said wing members in a direction away from said pin diverging from said guide member; a closure member mounted on one of said plates between said wings; the adjacent ends of said wings spaced from said guide member a distance less than the width of said stud; said closure member, the adjacent end of said wings and the nexus of said guide member constituting walls defining a capture chamber; each of said plates independently pivotable about said pivot pin whereby under the urging of said stud against one of said wings in a direction toward said capture chamber said plate connected to said wing will pivot about said pin for separating said wing and said guide member sufficiently to allow said stud to enter said guide chamber;

means urging apart the ends of said plates mounting said wings; a stop mounted to said frame on the opposite side of said pin from said wings and adapted to limit movement of said plates toward each other; wall elements on said plates adapted to contact said stop and limit movement of said plates toward said guide member; lever means beneath said frame and mounted to said frame for reciprocating movement transversely of said conveyor; a stud element secured to both said plates and said lever means for transmitting the motion of said lever means to said plates and sliding said plates toward and away from said guide member.

7. A capture element for a conveyor, said conveyor having at least one pallet travelling therealong, said pallet having a downwardly extending stud, said capture element comprising: a frame mounted on and traversely of said conveyor; a pair of upstanding support members mounted on said frame and aligned in tandem about the centerline of said conveyor; each of said guides including a pair of spaced guide plates; a movable member slidably mounted on each of said support members for reciprocable vertical movement; means independently urging each of said movable members upwardly; a lever pivotally mounted adjacent one of its ends below and to one end of said frame; a tension member attached at one end to one of said movable members and at the other end to said lever whereby downward movement of said lever will impart like movement to said movable member.

8. A pallet arresting means for a conveyor system, said conveyor system having at least one pallet equipped with a downwardly directed stud movable along said conveyor, said pallet arresting means comprising: a frame mounted on said conveyor; a plurality of spaced walls mounted on said frame, said walls defining a capture chamber therebetween; a first one of said walls movably mounted; said first wall being inclined to the path of travel of said stud and diverging from said path of travel upstream thereof whereby it may be moved in relation to the others of the walls of said capture chamber by said stud for admitting said stud to said capture chamber; a second one of said walls inclined to the path of travel of said stud and diverging from said path of travel downstream thereof, said second wall being adapted to resist movement by said stud when said stud is moving downstream; said second wall being movably mounted whereby it may be moved in relation to the others of the walls of said capture chamber for discharging said stud from said capture chamber; a lever member and means movably mounting said lever member to said frame; connecting means secured to both said lever member and said second one of said walls for transmitting movement of said lever member to said second one of said walls.

9. In a conveyor system having a work station and at least one pallet movable along said conveyor, said pallet having a downwardly directed stud, said work station comprising: a pair of parallel spaced rails; a plurality of pallet supporting wheels mounted on said rails; a frame extending between and mounted on said rails; a plurality of spaced walls mounted on said frame, said walls defining a capture chamber therebetween; a first one of said walls movably mounted; said first wall being inclined to the path of travel of said stud and diverging from said path of travel upstream thereof whereby it may be moved in relation to the others of the walls of said capture chamber by said stud for admitting said stud to said capture chamber; a second one of said walls inclined to the path of travel of said stud and diverging from said path of travel downstream thereof, said second wall being adapted to resist movement by said stud when said stud is moving downstream; said second wall being movably mounted whereby it may be moved in relation to the others of the walls of said capture chamber for discharging said stud from said capture chamber; a lever member and means movably mounting said lever member to said frame; connecting means secured to both said lever member and said second one of said walls for transmitting movement of said lever member to said second one of said walls.

References Cited in the file of this patent

UNITED STATES PATENTS

| Number | Name | Date |
|---|---|---|
| 283,947 | Augspath | Aug. 28, 1883 |
| 777,852 | Gunckel | Dec. 20, 1904 |
| 1,716,664 | Prince | June 11, 1929 |
| 1,730,519 | McKee | Oct. 8, 1929 |
| 2,234,620 | Botley | Mar. 11, 1941 |
| 2,277,710 | Mertzanoff et al. | Mar. 31, 1942 |
| 2,572,011 | Cohen et al. | Oct. 23, 1951 |
| 2,619,916 | Rainier | Dec. 2, 1952 |